United States Patent
Salgueiro et al.

(10) Patent No.: US 10,425,458 B2
(45) Date of Patent: Sep. 24, 2019

(54) ADAPTIVE BIT RATE STREAMING WITH MULTI-INTERFACE RECEPTION

(71) Applicant: CISCO TECHNOLOGY, INC., San Jose, CA (US)

(72) Inventors: Gonzalo Salgueiro, Raleigh, NC (US); Kaustubh Inamdar, Bangalore (IN); Ram Mohan Ravindranath, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 264 days.

(21) Appl. No.: 15/293,591

(22) Filed: Oct. 14, 2016

(65) Prior Publication Data

US 2018/0109579 A1 Apr. 19, 2018

(51) Int. Cl.
*G06F 15/177* (2006.01)
*H04L 29/06* (2006.01)

(52) U.S. Cl.
CPC .......... *H04L 65/601* (2013.01); *H04L 65/102* (2013.01); *H04L 65/4076* (2013.01); *H04L 65/607* (2013.01)

(58) Field of Classification Search
USPC ........................................................ 709/220
See application file for complete search history.

(56) References Cited

U.S. PATENT DOCUMENTS

| | | | |
|---|---|---|---|
| 7,577,750 B2 * | 8/2009 | Shen | H04L 29/06027 709/203 |
| 7,826,348 B2 | 11/2010 | Farinacci et al. | |
| 7,831,772 B2 * | 11/2010 | Nalawade | G06F 12/0871 707/736 |
| 7,885,340 B2 * | 2/2011 | Greenbaum | H04N 21/23439 375/240.28 |
| 8,094,569 B2 * | 1/2012 | Gunukula | H04J 3/14 370/242 |
| 8,218,430 B2 | 7/2012 | Zhao | |
| 8,311,102 B2 * | 11/2012 | Lu | H04N 21/23424 375/240.1 |
| 8,640,174 B2 * | 1/2014 | Salkintzis | H04L 47/762 725/62 |

(Continued)

OTHER PUBLICATIONS

Tzeng, Hong-Yi et al., "On Max-Min Fair Congestion Control for Multicast ABR Service in ATM", IEEE Journal on Selected Areas in Communications, vol. 15, No. 3, Apr. 1997, pp. 545-555. (Year: 1997).*

(Continued)

*Primary Examiner* — Alicia Baturay
(74) *Attorney, Agent, or Firm* — Cindy Kaplan (57) ABSTRACT

In one embodiment, a method includes receiving content in a first format at a first interface at an adaptive bit rate client, playing the content received at the first interface at the adaptive bit rate client, monitoring network conditions at the first interface, receiving the content in a second format at a second interface at the adaptive bit rate client, and upon identifying a change in the network conditions at the first interface, switching from playing the content received on the first interface to playing the content received at the second interface at the adaptive bit rate client. An apparatus and logic are also disclosed herein.

19 Claims, 4 Drawing Sheets

(56) References Cited

U.S. PATENT DOCUMENTS

| | | | | |
|---|---|---|---|---|
| 8,717,869 B2* | 5/2014 | Yang | | H04L 41/0654 |
| | | | | 370/216 |
| 8,750,188 B2* | 6/2014 | Nicoara | | H04W 48/18 |
| | | | | 370/311 |
| 8,824,470 B2* | 9/2014 | Wu | | H04L 12/1822 |
| | | | | 370/390 |
| 8,874,777 B2* | 10/2014 | Ma | | G06Q 30/0241 |
| | | | | 370/486 |
| 8,897,753 B2* | 11/2014 | Salkintzis | | H04L 65/601 |
| | | | | 455/412.1 |
| 8,959,244 B2* | 2/2015 | Lin | | G06Q 30/0241 |
| | | | | 709/231 |
| 9,014,027 B2* | 4/2015 | Hayes | | H04W 28/0231 |
| | | | | 370/252 |
| 9,019,817 B2 | 4/2015 | Hong et al. | | |
| 9,043,467 B2* | 5/2015 | Kovvali | | H04W 28/06 |
| | | | | 709/223 |
| 9,160,697 B2* | 10/2015 | Rogers | | H04L 51/14 |
| 9,307,393 B2* | 4/2016 | Hsu | | H04L 61/251 |
| 9,326,132 B2* | 4/2016 | Salkintzis | | H04L 65/601 |
| 9,338,212 B2* | 5/2016 | Hayes | | H04W 28/0231 |
| 9,426,089 B2* | 8/2016 | Gordon | | H04L 47/783 |
| 9,503,490 B2* | 11/2016 | Gao | | H04L 65/1083 |
| 9,565,719 B2* | 2/2017 | Xu | | H04W 76/16 |
| 9,635,589 B2* | 4/2017 | Singh | | H04W 36/0016 |
| 9,910,893 B2* | 3/2018 | Li | | G06F 16/24552 |
| 9,952,919 B2* | 4/2018 | Feld | | G06F 11/183 |
| 10,070,153 B2* | 9/2018 | Easterling | | H04N 21/2146 |
| 2002/0133601 A1* | 9/2002 | Kennamer | | H04L 67/1034 |
| | | | | 709/229 |
| 2006/0095478 A1* | 5/2006 | Cherkauer | | G06F 11/1662 |
| 2012/0099422 A1 | 4/2012 | Liu et al. | | |
| 2013/0051220 A1* | 2/2013 | Ryshakov | | H04L 12/4625 |
| | | | | 370/221 |
| 2013/0332621 A1* | 12/2013 | Keller | | H04L 65/60 |
| | | | | 709/231 |
| 2014/0359166 A1 | 12/2014 | Mamidwar et al. | | |
| 2014/0359678 A1* | 12/2014 | Shivadas | | H04N 21/6587 |
| | | | | 725/88 |
| 2015/0271226 A1* | 9/2015 | Luby | | H04L 47/125 |
| | | | | 709/231 |
| 2015/0358236 A1 | 12/2015 | Roach et al. | | |
| 2017/0111468 A1* | 4/2017 | Ash | | H04L 67/2852 |
| 2019/0097905 A1* | 3/2019 | Hallivuori | | H04L 43/062 |

OTHER PUBLICATIONS

IETF RFC 6824, "TCP Extensions for Multipath Operation with Multiple Addresses", A. Ford et al., Jan. 2013.

* cited by examiner

ADAPTIVE BIT RATE STREAMING WITH MULTI-INTERFACE RECEPTION

TECHNICAL FIELD

The present disclosure relates generally to communication networks, and more particularly, to adaptive bit rate streaming.

BACKGROUND

In Adaptive Bit Rate (ABR) streaming of video content, adaptive streaming clients may rely on various parameters to make a rate adaptation decision to upshift, downshift, or remain at the current bitrate. The client may be provided with a manifest file that advertises different bit rate encodings so that the client can upshift or downshift based on network conditions. These additional client-requested encodings may have to be fetched from a content delivery network if they are not locally cached. For example, a single high quality encoding may be multicast into the network and additional encodings fetched via unicast from the content delivery network.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving content in a first format at a first interface at an adaptive bit rate client, playing the content received at the first interface at the adaptive bit rate client, monitoring network conditions at the first interface, receiving the content in a second format at a second interface at the adaptive bit rate client, and upon identifying a change in the network conditions at the first interface, switching from playing the content received on the first interface to playing the content received at the second interface at the adaptive bit rate client.

In another embodiment, an apparatus generally comprises a plurality of interfaces for communication with a content source and an adaptive bit rate client, memory for storing content received from the content source, and a processor for processing a request for the content in a first format from a first interface of the adaptive bit rate client, transmitting the content in the first format to the adaptive bit rate client on the first interface, processing a request for the content in a second format from a second interface of the adaptive bit rate client, and transmitting the content in the second format to the adaptive bit rate client on the second interface while continuing to transmit the content in the first format to the adaptive bit rate client on the first interface.

In yet another embodiment, logic is encoded on one or more non-transitory computer readable media for execution and when executed operable to process content in a first format at a first interface at an adaptive bit rate client, play the content received at the first interface at the adaptive bit rate client, monitor network conditions at the first interface, receive the content in a second format at a second interface at the adaptive bit rate client, and upon identifying a change in the network conditions at the first interface, switch from playing the content received at the first interface to playing the content received at the second interface at the adaptive bit rate client.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In adaptive streaming, also referred to as adaptive bit rate (ABR) streaming, dynamic streaming, or live streaming, a source video is encoded such that the same content is available for streaming at a number of different rates. The content stream is generally structured as an array of content chunks (e.g., pieces of content, fragments, segments, or other suitable sub-divisions of an entire instance of content). An adaptive streaming client (e.g., ABR client) can access chunks stored on servers using a Web paradigm (e.g., HTTP (Hypertext Transfer Protocol) operating over a TCP (Transmission Control Protocol)/IP (Internet Protocol) transport) and make a decision about which specific representation (format) (e.g., video encoding rate) of any given content it will request from the server. The decision may be based on various parameters or observations, including, for example, current bandwidth (e.g., based on monitored delivery rate). Throughout the duration of a given viewing experience, the ABR client may upshift to a higher encoding rate to obtain better quality when available bandwidth increases, or downshift to a lower encoding rate when available bandwidth decreases.

In one example, in order to provide bandwidth savings, content may be transmitted via multicast. This may be done, for example, by multicasting a single high quality encoding into the network, which uses high bandwidth and optimal network quality over a prolonged period. For the sake of robustness, the client may be provided with a manifest file that advertises different bit rate encodings so that the client can upshift or downshift based on network conditions. A drawback with this model is that these additional client-requested encodings generally have to be fetched via unicast from a CDN (Content Delivery Network) since they are not locally cached by a local CDN gateway.

Due to bandwidth choking, interface flapping, or unfavorable prevailing network conditions, the client may be forced to request a lower bit rate encoding. This may result in the client having to contact a tier one CDN and wait for the content to be served up in segments and an adequate amount of video content buffered before playing the content out to a receiver. This delay, in the context of video content streaming, may lead to a very poor user experience.

The embodiments described herein provide multi-interface (i.e., multiple physical or logical interfaces) and associated paths from an adaptive bit rate client to an intermediate node (e.g., local CDN gateway interposed between the client and content source) so that the client can receive a high quality/bandwidth encoding in an uninterrupted manner to provide an improved viewing experience. In one or more embodiments, an ABR client may join an M-ABR (Multicast-Assisted ABR) session and dynamically request additional encodings of a video on a passive path when an active path quality degrades and use the passive path to render video when the active path quality further degrades. One or more embodiments may also allow clients to dynamically switch between higher bit rate and lower bit rate encodings based on path characteristics.

Figure 1:
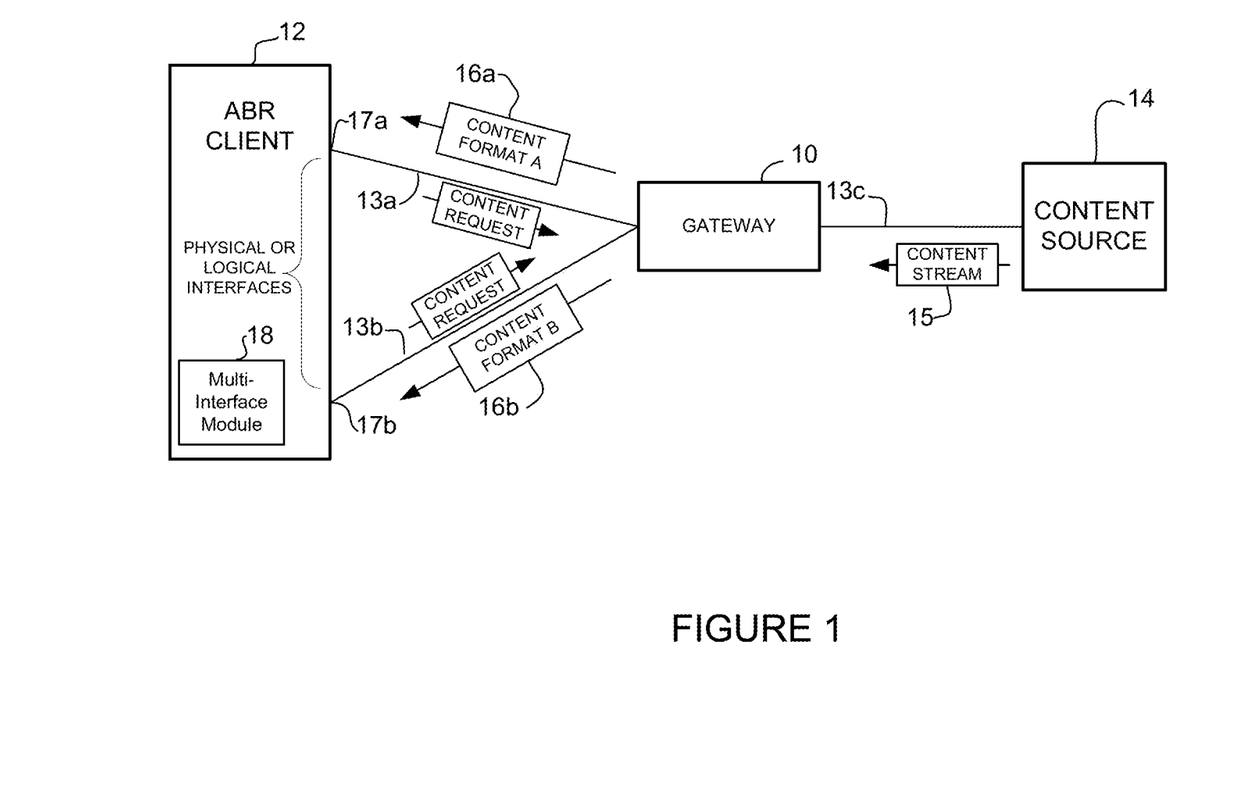
FIG. 1 illustrates an example of a network in which embodiments described herein may be implemented.

Referring now to the drawings, and first to FIG. 1, an example of a network in which embodiments described herein may be implemented is shown. The embodiments operate in the context of a data communication network including multiple network devices (components, elements, nodes). For simplification, only a small number of network devices and data paths are shown. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, the network comprises an intermediate node 10 (e.g., CDN gateway) located on a data path between an adaptive bit rate (ABR) client 12 (e.g., endpoint, request originator, content receiver, ABR video client, adaptive streaming client) and a content source 14 (e.g., server, origin server, CDN, CDN cache). In one embodiment, the communication system includes an adaptive streaming video system that makes use of multi-rate video encodings and an IP transport protocol suite (e.g., HTTP/TCP/IP/UDP or other equivalent protocols) to deliver high quality streaming video to a plurality of simultaneous users under varying network conditions.

In the example shown in FIG. 1, the gateway 10 is in communication with the client 12 via two data paths 13a, 13b for delivering the content in two different formats (format A, format B). The data paths between the ABR client 12 and the source 14 (13a, 13b, 13c) may include any number or type of intermediate nodes (e.g., routers, switches, gateways, cache nodes, or other network devices). The gateway 10 may be located, for example, within any number of communication paths between any number of endpoints and may be used to transmit data received from any number of sources 14 or requested by any number of clients 12. The endpoints 12, 14 may comprise any network device or combination of devices configured for receiving, transmitting, or receiving and transmitting data (content).

The gateway 10 is configured for use in a content delivery system and operable to acquire and stream media and deliver content to one or more locally connected client devices 12. The gateway 10 provides physical and logical interfaces between ABR (e.g., multicast ABR) sourced from the network and standard ABR video delivery to the requesting client 12. As shown in the example of FIG. 1, the gateway 10 receives a content stream 15 from the content source 14 and delivers the content to the client 12 on two data paths 13a, 13b. The gateway 10 may comprise a router, switch, proxy, server, or other network device. The gateway may be configured, for example, as a set-top terminal (box) that receives, processes, and distributes signals to one or more IP enabled viewing devices and distributes stream media to one or more locally connected ABR client devices 12.

The gateway 10 may store or cache content that was encoded and segmented at another device or may comprise a local transcoder for the purpose of transcoding and delivering the content of content stream 15 to the locally connected client device 12. For example, the gateway 10 may include a transcoder that receives and transcodes content streams and operates as an intermediary for requests from one or more local client devices 12 for live digital content or streaming media. The transcoder and an ABR server at the gateway may be used to deliver content to the locally connected device 12. In one example, the content stream 15 may be received in a source format provided by the content source 14 and advertised to the client 12 in two or more formats determined by the ABR server. Formats may include, for example, different bit rates, codec's compression schemes, and the like. The gateway 10 may advertise the two or more local data formats through the use of a manifest file, which includes a stream profile for each stream and a playlist that describes the segments available from the gateway 10.

In one example, the gateway 10 may operate in a Multicast-Assisted Adaptive Bit Rate (M-ABR) environment. One or more encoded high quality streams may be multicast from the source 14 to any number of gateways 10. The multicast stream may then be translated by the local gateway 10 into a unicast stream before being served to the requesting client 12.

The content source 14 is capable of serving one or more content receivers (ABR clients) 12. The content may include any suitable information that can propagate in the network. Thus, the term "video content" as used herein may include video, images, graphics, text, Web pages, audio, or other data or combination thereof, that can be played at the client device 12. The content transmitted from the content source 14 may be encrypted, compressed, or encoded according to any format. There may be any number of content sources 14 providing content to any number of clients 12.

The content source 14 may be, for example, a server (e.g., origin server) or group of servers that store data locally or obtain the content from another server or media source via another network, satellite, cable, or any other communication device or system. The content source 14 may be located in a content delivery network operable to acquire and stream media. The content delivery network may include streaming applications for content delivery to digital televisions and set-top boxes, and Internet streaming applications for content delivery to IP devices such as personal computers, mobile phones, and handheld devices, for example. The content delivery network may distribute network data onto geographically diverse servers.

The client 12 may be any network device operable to request and receive content from content source 14. The client 12 may be associated with one or more devices, customers, or end users that want to receive content in the communication system. The client 12 may be wired or wireless and may include, for example, a desktop computer, laptop computer, cellular phone, smart phone, personal digital assistant (PDA), tablet, multimedia device, television with communication capabilities, or any other device operable to initiate or respond to video, audio, media, or data exchanges within the communication system. The client 12 may also be a device that seeks to engage in communications on behalf of another entity or element, such as a program, database, or other component. The client device 12 may be in communication with the gateway 10 via Wi-Fi, Ethernet, Bluetooth, radio frequency, cable, fiber optic, or other network infrastructure.

In one embodiment, the client 12 includes at least two interfaces (e.g., interfaces, paths) 17a, 17b (e.g., multi-homed client) and a multi-interface module 18 (application, logic, software, code, firmware, etc.) operable to request two (or more) different formats (e.g., bit rate encodings) 16a, 16b of the same content simultaneously over the different interfaces and select one of the encodings for rendering (playing) at the client. A higher bandwidth and more reliable interface may be used for a higher bit rate encoding and another lower bandwidth and less reliable interface may be used for a medium to low bit rate encoding. The client 12 may comprise any number of interfaces for any number of different encodings of the same content.

The interfaces 17a, 17b may comprise physical, logical, or virtual interfaces or paths (e.g., wired Ethernet LAN (Local Area Network), 802.11 WLAN (Wireless LAN), 3G cell network, VPN (Virtual Private Network) connections, tunnels, etc.). Thus, the term "interface" as used herein may refer to a physical interface or a logical (virtual) interface (e.g., IP address associated with a path). In one example, the interfaces 17a, 17b comprise physical interfaces or ports. In another example, the interfaces 17a, 17b comprise a single port (physical interface) comprising multiple logical interfaces, each associated with a different path between the gateway 10 and client 12. For example, a client running on a host device may be connected to an ISP (Internet Service Provider) who will be giving multiple IP addresses (e.g., one IPv4 and one IPv6). The applications running on the host (e.g., ABR client) can use each of the IP addresses to talk to the CDN gateway 10. Each IP address may result in a unique network path. The interfaces 17a, 17b at the client 12 may be in communication with the same interface at the gateway 10 or different interfaces at the same or different gateways.

As described in detail below, the multi-interface module 18 may identify one of the interfaces (e.g., 17a in FIG. 1) as an active interface (path) and the other interface (e.g., 17b) (or interfaces) as a passive interface (path). Thus, one encoding (content format A (16a)) may be designated as an active stream (content from which the client renders and plays out as video) and another encoding (content format B (16b)) as a passive stream, which the client does not render or play out. If network conditions on the active stream become bad (e.g., deteriorate or fall below a specified threshold), the client may switch immediately to rendering content from the passive stream. The multi-interface module 18 may then mark the active stream as passive, and the passive stream as active. Since the other encoding (e.g., content format B in FIG. 1) is immediately available at the client 12, there is no delay or interruption to the viewer, as would be present if the client had to contact the CDN for a lower encoding unicast stream.

In one or more embodiments, the client 12 may attempt to repair the new passive stream. This may involve, for example, attaching a new high bandwidth interface, fetching a new encoding from the CDN and buffering it, and the like. Once the passive (inactive) path is repaired, if it has a better quality encoding than the active path, the client may dynamically switch between the active and passive flows and stream the higher quality encoding, without any impact to the viewer experience.

In one embodiment, the client 12 may initially only request a single encoding 16a on the active interface 17a, while continuously monitoring the network conditions on the active interface, and only request content on the passive interface 17b under certain conditions (e.g., if the network conditions deteriorate below a default or client threshold for one or more parameters). A policy may be defined, for example, such that content is requested on the second interface when active stream buffered data drops below a specified threshold. This allows the client to dynamically decide when to request video on its second interface, thereby saving bandwidth that would be used to receive the content on its passive interface.

The threshold used to make the decision to request content on the second interface is different than the threshold used by the multi-interface module 18 in making a decision to switch from the active to passive stream so that the passive stream is immediately available if the network conditions continue to deteriorate and fall below the threshold at which the client 12 switches to the passive stream. Any type of change in network condition, including one or more parameters reaching or extending past (below/above) a specified threshold, may be selected (or predefined) for use in initiating a request for content at a second (or third, etc.) interface. The threshold or specified change in network conditions may be based on one or more factors including, for example, type of link, minimum expected download rate, or any other factor or combination of factors.

If content is only requested on the passive stream under certain network conditions, these limits are typically set sufficiently far apart from the specified network conditions at which the active stream is replaced with the passive stream so that the passive stream is available at the client device 12 before the multi-interface module 18 switches to rendering video from the active stream to the passive stream. The threshold used to start the request of data on the second interface may be such that it triggers the receipt of the alternate stream with minimal deterioration of network conditions. In many cases, the network may recover soon enough so that the switch to the passive stream may not be needed.

It is to be understood that the network shown in FIG. 1 and described above is only an example and the embodiments described herein may be implemented in networks comprising different network topologies or network devices without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. Moreover, the topology illustrated in FIG. 1 and described above is readily scalable and may accommodate a large number of components, as well as more complicated arrangements and configurations. Thus, network nodes (elements, devices) may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communication.

Figure 2:
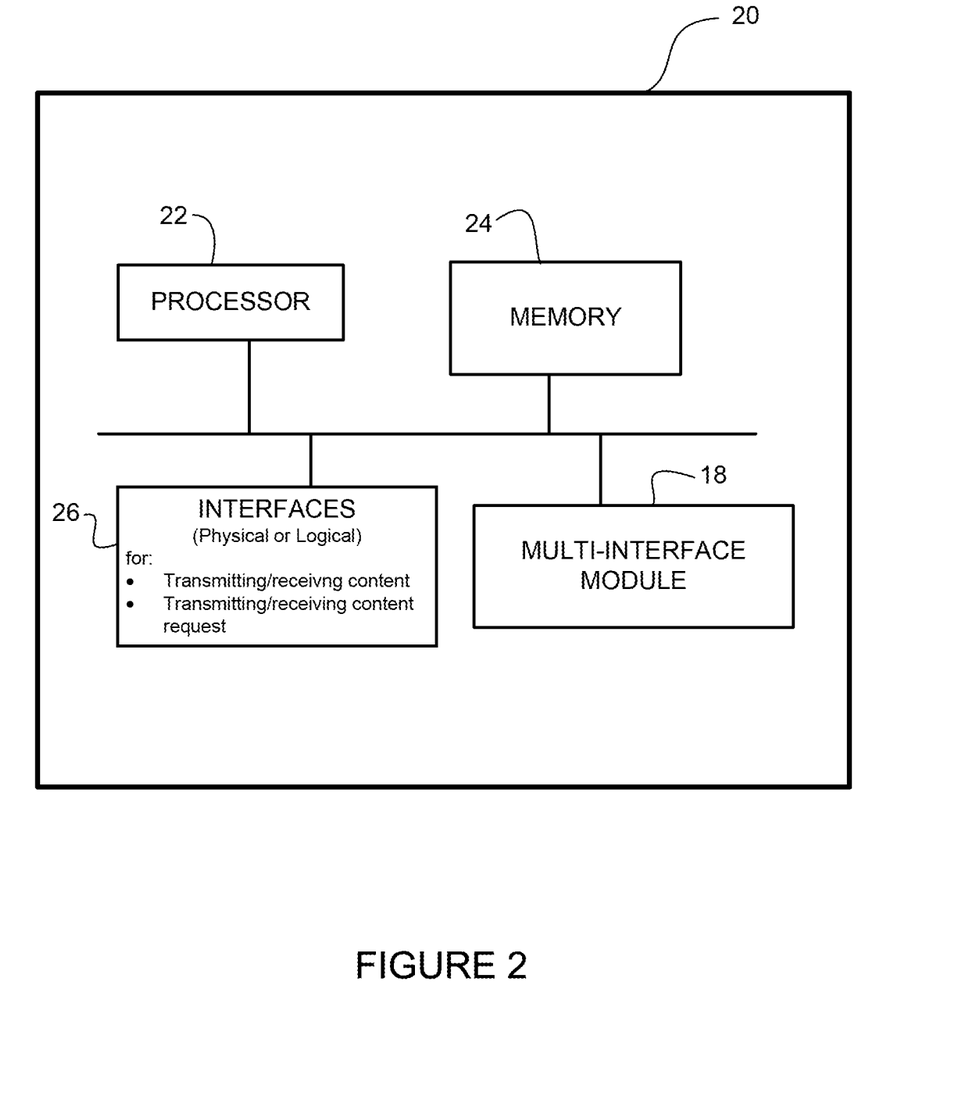
FIG. 2 depicts an example of a network device useful in implementing embodiments described herein.

FIG. 2 illustrates an example of a network device 20 (e.g., gateway 10, client device 12 in FIG. 1) that may be used to implement the embodiments described herein. In one embodiment, the network device 20 is a programmable machine that may be implemented in hardware, software, or any combination thereof. The network device 20 includes one or more processor 22, memory 24, network interfaces 26, and multi-interface module 18 (e.g., logic, software, firmware).

Memory 24 may be a volatile memory or non-volatile storage, which stores various applications, operating systems, modules, and data for execution and use by the processor 22. For example, multi-interface module (e.g., code, logic, software, firmware, etc.) of the client 12 may be stored in memory 24. Memory 24 at the gateway 10 may also store or buffer (e.g., temporarily) video content from the content source before transmitting to the client 12. The network device 20 may include any number of memory components.

Logic may be encoded in one or more tangible media for execution by the processor 22. For example, the processor 22 may execute codes stored in a computer-readable medium such as memory 24 to perform the processes described below with respect to FIGS. 3 and 4. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interfaces 26 may comprise any number of physical interfaces (linecards, ports) or logical interfaces (e.g., IP addresses associated with different paths) for receiving data or transmitting data to other devices. The network interfaces 26 may be configured to transmit or receive data using a variety of different communication protocols. The physical network interface may include, for example, an Ethernet interface or wireless interface for connection to a computer or network and may be associated with one or more logical interfaces. The physical interface may include mechanical, electrical, and signaling circuitry for communicating data over physical links coupled to the network.

As previously described, the client 12 may include two or more interfaces 26 for receiving the same content in different formats (e.g., bit rate encodings). These interfaces 26 may be used for requesting and receiving content. The gateway 10 may comprise one or more interfaces 26 for receiving requests for content from the multiple interfaces at the client 12 and transmitting the content in different formats to the client.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

Figure 3:
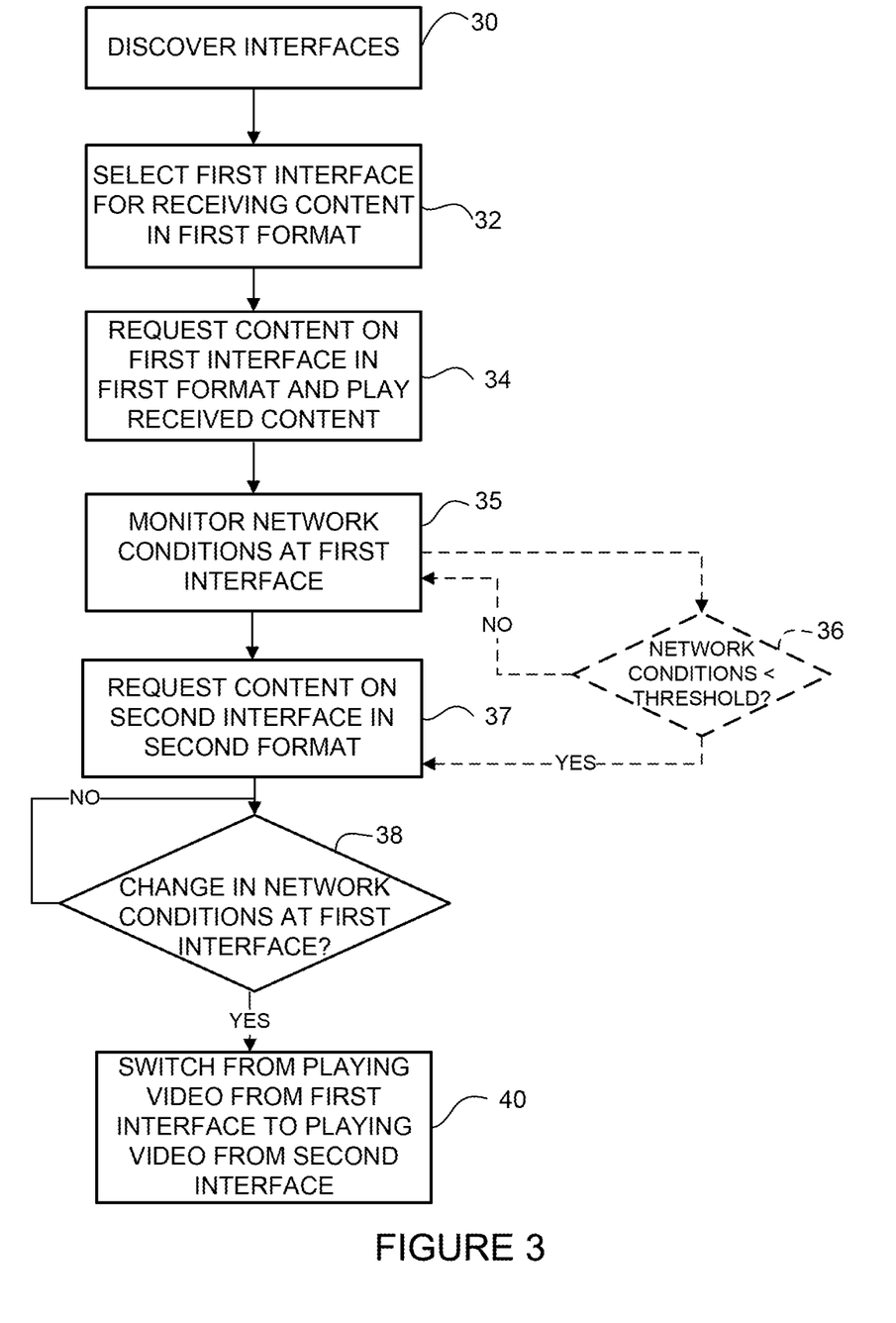
FIG. 3 is a flowchart illustrating an overview of a process for adaptive bit rate streaming with multi-interface reception at an adaptive bit rate client, in accordance with one embodiment.

FIG. 3 is a flowchart illustrating an overview of a process for adaptive bit rate streaming with multi-interface reception at the client 12. At step 30, the ABR client 12 discovers its available interfaces 17a, 17b (FIGS. 1 and 3). The client 12 may use any suitable discovery mechanism (e.g., MIF (Multiple Interface) discovery) to discover its different interfaces. As previously noted, the interface may comprise a physical interface or logical interface associated with a path. A mechanism such as PCP-Flowdata or other suitable means may be used by the client 12 to measure available bandwidth, latency, and other flow parameters on each interface against desired flow characteristics for use in selecting the best interface to receive the data stream. After the client 12 selects the first interface (step 32), the client requests content (e.g., video content) from its local CDN gateway 10 on the first interface 17a in a first format (e.g., bit rate encoding) and once received, the video content can be rendered and played at the client device (step 34) (FIGS. 1 and 3). The multi-interface module 18 designates the content received at the first interface as an active stream. The client 12 monitors network conditions at the first interface (step 35). Monitoring may include monitoring one or more parameters either continuously or periodically so that the client can identify a change in network conditions. Monitoring of network conditions by the client 12 may also include processing notifications of changes in network conditions. For example, if the client had used PCP and its extensions (PCP FLOWDATA) earlier to select a best interface, the PCP servers on the selected path can send a PCP NOTIFY if the path characteristics degrades. In this way, the client need not poll periodically, while still monitoring network conditions.

The client 12 also selects a second interface for receiving the same content from the gateway 10 in a different format (e.g., different bit rate encoding). The client may request video at a second encoding on the second interface (step 37) at approximately the same time that the client requests the video at the first encoding on the first interface or may optionally wait to request the video on the second interface until network conditions change at the first interface (step 36). In one embodiment, the client 12 continuously monitors the network conditions on the selected interface 17a (step 35) and if the network conditions start to deteriorate (e.g., based on a client defined threshold as previously described), the client may request the same content in a second format on its second interface (steps 36 and 37). This allows the client 12 to decide when to request the video content on its additional interface (or interfaces).

The content received at the second encoding is designated by the multi-interface module 18 as a passive stream and is not rendered as video at the client device unless network conditions further deteriorate or otherwise change (step 38). If the network conditions at the first interface change (e.g., network conditions fall below a specified threshold, inadequate segments in client buffer, no segments received due to interface loss, etc.), the client may switch from rendering video content received on the first interface to rendering video content received at the second interface (step 40). The switchover process at the client 12 may involve marking the active stream as passive and the passive stream as active. This may result in significant time savings for rendering content since there is no need to contact the content delivery network and wait for a lower encoding unicast stream or buffer segments, since the content is already available at the client device 12. As described below, the client may also attempt to repair the passive stream and switch back to rendering content received at the first interface, if network conditions improve on the first interface. Thus, the client 12 may transition to a lower bitrate/resolution or higher bitrate/resolution.

Figure 4:
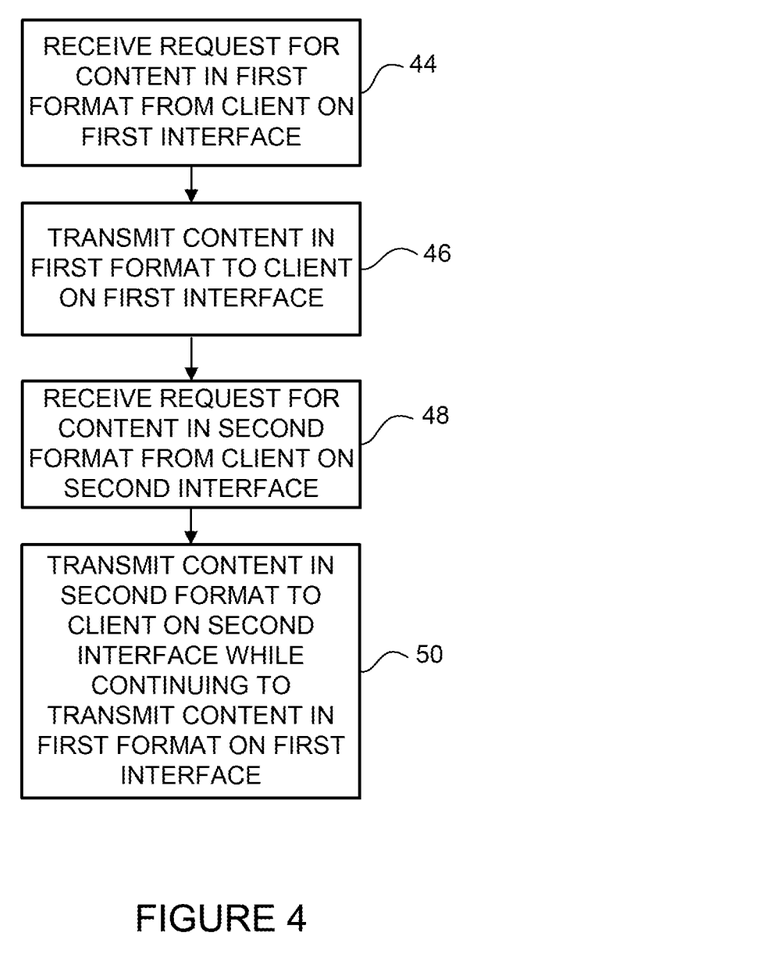
FIG. 4 is a flowchart illustrating an overview of a process for adaptive bit rate streaming at a gateway for multi-interface reception at the adaptive bit rate client, in accordance with one embodiment.

FIG. 4 illustrates a process at the gateway 10 for providing content simultaneously in two different formats to the client device 12. At step 44, the gateway 10 receives a request from a first interface of the client 12 for content in a first format (e.g., bit rate encoding). The gateway 10 transmits the content in the first format to the client 12 on the first interface (step 46). The gateway 10 also receives a request for the same content in a second format on a second interface at the same client 12 (step 48). As described above, the requests may be received at approximately the same time or the request for the video content in the second format may be received after a period of time when network conditions have changed on the first interface. The gateway 10 sends the content in the second format on the second interface while continuing to send the content in the first format on the first interface to the client (step 50).

It is to be understood that the processes shown in FIGS. 3 and 4, and described above are only examples and that steps may be added, deleted, combined, reordered, or modified without departing from the scope of the embodiments. For example, the steps may be repeated for any number of interfaces at the client 12 or different formats for the streaming video content. Also, the processor shown in FIG. 2 and described above may be used to implement one or more steps shown in FIGS. 3 and 4.

As previously described, while the client 12 dynamically switches stream preferences and renders the lower quality encoding stream, it may simultaneously repair the passive stream. This may include, for example, attaching a new high bandwidth interface, fetching a new encoding from a CDN, buffering it, etc. This may also include going through a number of different encodings, observing quality for different encodings, and then locking in on one encoding that can be served up reliably. Since the content is available for play at the second interface, the client 12 may perform stream repair while the viewer is still served up with continuous video content.

Once the network conditions improve on the passive/ inactive repair path, if it has a better quality encoding, the client can again dynamically switch between the active and passive flow and stream the higher quality encoding. Once the active path is repaired and is able to accommodate the requested flow characteristics, the client may choose to stop requesting the video streams on the passive paths.

In case none of the available paths (interfaces) are able to accommodate the requested encoding of the client, the client may choose to request a lower bit rate encoded stream for the same video stream based on the available bandwidth. The client may dynamically shift across a lower bit rate or higher bit rate depending on the network characteristics.

As can be observed from the foregoing, the embodiments described herein provide many advantages. For example, one or more embodiments may provide zero down time when the client has to render a different encoding media stream. Thus, a viewer may not notice any delay, even if the client has to migrate between encodings. One or more embodiments may allow the client to perform proper stream repair while the viewer is still served up with continuous video content, even if the repair means going through a number of different encodings, observing quality for different encodings, and then locking in on one encoding that can be served up reliably. One or more embodiments may provide the ability to concurrently repair and playout media streams and provide a high degree of robustness to varying network conditions, packet drops, and interface flaps.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    transmitting a first request for content in a first format to a gateway in communication with a content source;
    receiving content in said first format at a first interface at an adaptive bit rate client;
    playing said content received at said first interface at the adaptive bit rate client;
    monitoring network conditions at said first interface at the adaptive bit rate client;
    transmitting a second request for said content in a second format to the gateway;
    receiving said content in said second format at a second interface at the adaptive bit rate client while continuing to receive said content in said first format at said first interface at the adaptive bit rate client; and
    upon identifying a change in said network conditions at said first interface, switching from playing said content received at said first interface to playing said content received at said second interface at the adaptive bit rate client;
    wherein said first format and said second format comprise two different bit rate encodings and the gateway comprises an intermediate node interposed between the content source and the adaptive bit rate client.

2. The method of claim 1 further comprising discovering said first and second interfaces and marking said first interface as an active path and said second interface as a passive path.

3. The method of claim 1 further comprising identifying deterioration in said network conditions below a specified threshold at said first interface and requesting said content in said second format at said second interface before receiving said content in said second format at said second interface.

4. The method of claim 1 wherein identifying a change in said network conditions at said first interface comprises identifying a change in a network parameter beyond a specified threshold.

5. The method of claim 1 further comprising repairing said first interface and switching playing of said content from said second interface back to said first interface.

6. The method of claim 5 further comprising stopping said receiving of said content in said second format at said second interface.

7. The method of claim 1 further comprising requesting said content from a local multicast-assisted adaptive bit rate gateway.

8. The method of claim 1 wherein said first and second interfaces comprise logical interfaces at the adaptive bit rate client.

9. An apparatus comprising:
    a plurality of interfaces for communication with a content source and an adaptive bit rate client;
    memory for storing content received from the content source; and
    a processor for processing a request for said content in a first format from a first interface of the adaptive bit rate client, transmitting said content in said first format to the adaptive bit rate client on said first interface, processing a request for said content in a second format from a second interface of the adaptive bit rate client, and transmitting said content in said second format to the adaptive bit rate client on said second interface while continuing to transmit said content in said first format to the adaptive bit rate client on said first interface, wherein said first format and said second format comprise two different bit rate encodings and the apparatus comprises an intermediate node for insertion between the content source and the adaptive bit rate client.

10. The apparatus of claim 9 wherein said second request is received at the apparatus following deterioration in network conditions at said first interface.

11. The apparatus of claim 9 wherein said first interface comprises an active path for transmitting video played at the adaptive bit rate client and said second interface comprises a passive path.

12. The apparatus of claim 9 wherein the apparatus comprises a multicast-assisted adaptive bit rate gateway and one of said plurality of interfaces is for multicast communication with the content source.

13. Logic encoded on one or more non-transitory computer readable media for execution and when executed operable to:
 transmit a first request for content in a first format to a gateway in communication with a content source;
 process said content in said first format at a first interface at an adaptive bit rate client;
 play said content received at said first interface at the adaptive bit rate client;
 monitor network conditions at said first interface;
 transmit a second request for said content in a second format to the gateway;
 receive said content in said second format at a second interface at the adaptive bit rate client while continuing to receive said content in said first format at said first interface at the adaptive bit rate client; and
 upon identifying a change in said network conditions at said first interface, switch from playing said content received at said first interface to playing said content received at said second interface at the adaptive bit rate client;
 wherein said first format and said second format comprise two different bit rate encodings and the gateway comprises an intermediate node interposed between the content source and the adaptive bit rate client.

14. The logic of claim 13 further operable to discover said first and second interfaces and mark said content received on said first interface as an active stream and said content received on said second interface as a passive stream.

15. The logic of claim 13 further operable to identify deterioration in said network conditions below a specified threshold at said first interface and request said content in said second format at said second interface before receiving said content in said second format at said second interface.

16. The logic of claim 13 wherein said first and second interfaces comprise logical interfaces at the adaptive bit rate client.

17. The logic of claim 13 further operable to request said content from a local multicast-assisted adaptive bit rate gateway.

18. The logic of claim 13 further operable to repair said first interface and switch playing of said content from said second interface back to said first interface.

19. The logic of claim 13 further operable to stop said receiving of said content in said second format at said second interface.

* * * * *